US011084258B2

(12) United States Patent
Tuberquia et al.

(10) Patent No.: US 11,084,258 B2
(45) Date of Patent: Aug. 10, 2021

(54) FILM FOR PACKAGING

(71) Applicant: Dow Global Technologies LLC, Midland, MI (US)

(72) Inventors: Juan C. Tuberquia, Freeport, TX (US); Kumar N. Sanketh, Freeport, TX (US); Lori L. Kardos, Freeport, TX (US); Cody W. Lawrence, Freeport, TX (US); Lamy J. Chopin, III, Freeport, TX (US); William B. Bellefontaine, Plaquemine, LA (US); Joshua M. Jones, Midland, MI (US); Micah S. Vardeman, Midland, MI (US); Timothy E. Clayfield, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 227 days.

(21) Appl. No.: 16/061,559

(22) PCT Filed: Dec. 19, 2016

(86) PCT No.: PCT/US2016/067526
§ 371 (c)(1),
(2) Date: Jun. 12, 2018

(87) PCT Pub. No.: WO2017/112587
PCT Pub. Date: Jun. 29, 2017

(65) Prior Publication Data
US 2019/0255819 A1 Aug. 22, 2019

Related U.S. Application Data

(60) Provisional application No. 62/270,700, filed on Dec. 22, 2015.

(51) Int. Cl.
| | | |
|---|---|---|
| *B32B 27/08* | (2006.01) | |
| *B32B 25/14* | (2006.01) | |
| *B32B 25/20* | (2006.01) | |
| *B32B 27/32* | (2006.01) | |
| *B32B 25/08* | (2006.01) | |

(52) U.S. Cl.
CPC ............. *B32B 27/08* (2013.01); *B32B 25/08* (2013.01); *B32B 25/14* (2013.01); *B32B 25/20* (2013.01); *B32B 27/32* (2013.01); *B32B 2250/24* (2013.01); *B32B 2264/0207* (2013.01); *B32B 2307/31* (2013.01); *B32B 2307/54* (2013.01); *B32B 2307/72* (2013.01); *B32B 2319/00* (2013.01); *B32B 2323/046* (2013.01); *B32B 2323/10* (2013.01); *B32B 2323/16* (2013.01); *B32B 2439/00* (2013.01); *B32B 2439/46* (2013.01)

(58) Field of Classification Search
CPC ......... B32B 25/14; B32B 27/08; B32B 27/32; B32B 25/20; B32B 25/08; B32B 2323/16; B32B 2307/72; B32B 2264/0207; B32B 2319/00; B32B 2307/31; B32B 2250/24; B32B 2307/54; B32B 2323/046; B32B 2323/10; B32B 2439/46; B32B 2439/00
See application file for complete search history.

(56) References Cited

U.S. PATENT DOCUMENTS

| | | |
|---|---|---|
| 4,929,479 A | 5/1990 | Shishido et al. |
| 5,145,747 A | 9/1992 | Jottier |
| 5,415,905 A | 5/1995 | Middlesworth et al. |
| 5,500,260 A | 3/1996 | Halle et al. |
| 5,525,659 A | 6/1996 | Falla et al. |
| 2003/0216518 A1 | 11/2003 | Tau et al. |
| 2004/0023052 A1* | 2/2004 | Ambroise ............... B32B 27/32 428/515 |
| 2009/0197022 A1* | 8/2009 | Lu ............................ B05D 7/04 428/29 |
| 2010/0209640 A1 | 8/2010 | Yun |

FOREIGN PATENT DOCUMENTS

| | | |
|---|---|---|
| CA | 2269672 A1 | 6/1998 |
| WO | 2008/137285 A1 | 11/2008 |

OTHER PUBLICATIONS

Nho et al., Mechanical Properties of LDPE/Ethylene-1-butene Copolymer Films Crosslinked by Radiation (https://www.cheric.org/PDF/JIEC/IE12/IE12-6-0888.pdf) (Year: 2006).*
https://www.usplastic.com/knowledgebase/article.aspx?contentkey=508 (Year: 2008).*

* cited by examiner

*Primary Examiner* — Samir Shah
(74) *Attorney, Agent, or Firm* — Quarles & Brady LLP

(57) ABSTRACT

The present disclosure provides a film. In an embodiment, a multilayer film having at least three layers is provided. The multilayer film includes two skin layers, each skin layer composed of a blend of a low density polyethylene and an ethylene-based elastomer having a density less than 0.90 g/cc. The multilayer film also includes a core layer located between the skin layers. The core layer includes a propylene-based plastomer having a density less than 0.90 g/cc. The multilayer film has an onset end temperature from 90° C. to 110° C. and a heat seal strength at 120° C. from 1.5 N/cm to 2.5 N/cm.

8 Claims, No Drawings

FILM FOR PACKAGING

FIELD

The present disclosure is directed to a film and a package made from the film.

BACKGROUND

Batch inclusion packages (also known as compounding bags) are used to hold a variety of materials with the feature that the package is compatible to be melt-mixed with the material contained within the batch inclusion package. Materials suitable as content for batch inclusion packages include flowable solids (particles/pellets) such as carbon black, titanium dioxide powder, elastomers, rubbers, polystyrene and other solid and non-solid chemicals. Benefits attributed to batch inclusion packages include safety (reduction of dust health hazards) and content protection prior to use.

The batch inclusion package has several requirements including (i) compatibility with the material to be contained, (ii) low melt temperature, (iii) a narrow softening range, and (iv) extrudability. The film for the batch inclusion package also requires adequate stiffness for package integrity and strength, and the ability to be heat sealed in industrial scale bagging lines.

Known are batch inclusion packages made from ethylene/vinyl acetate copolymer (EVA) film. However, EVA resin with strength and stiffness suitable for batch inclusion packages typically has a melt temperature of 88° C. or greater, making EVA incompatible for many low temperature batch inclusion applications. The art recognizes the need for films with a melt temperature less than the melt temperature of EVA in order to expand the applicability of batch inclusion packages to materials with low melt temperature.

SUMMARY

The present disclosure provides a film. In an embodiment, a multilayer film having at least three layers is provided. The multilayer film includes two skin layers, each skin layer composed of a blend of a low density polyethylene and an ethylene-based elastomer having a density less than 0.90 g/cc. The multilayer film also includes a core layer located between the skin layers. The core layer includes a propylene-based plastomer having a density less than 0.90 g/cc. The multilayer film has an onset end temperature from 90° C. to 110° C. and a heat seal strength at 120° C. from 1.5 N/cm to 2.5 N/cm.

The present disclosure provides an article. In an embodiment, the article is a package and the package includes (A) an ingredient, and (B) a protective film. The protective film is a multilayer film having at least three layers. The multilayer film includes two skin layers. Each skin layer includes a blend of a low density polyethylene and an ethylene-based elastomer having a density less than 0.90 g/cc. The multilayer film includes a core layer located between the skin layers. The core layer includes a propylene-based plastomer having a density less than 0.90 g/cc. The multilayer film has an onset end temperature from 90° C. to 110° C. and a heat seal strength at 120° C. from 1.5 N/cm to 2.5 N/cm.

Definitions

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Bending stiffness is calculated as a function of the elastic modulus E and the beam geometry. In the case of multilayer films, the moment of inertia is calculated for each layer separately as the sum of the moment of inertia (I) of each individual layer relative to the neutral axis of the film as shown in Equation (1) below.

$$S_b = \frac{E \times I}{b} \qquad \text{Equation (1)}$$

$S_b$ = bending stiffness (Nm)

$E$ = the elastic modulus (N/m$^2$)

$I$ = the moment of inertia of the beam (m$^4$)

$b$ = the width of the beam (m)

Bending stiffness is disclosed in the following article: J. Lange, C. Pelletier and Y. Wyser; MODELING AND MEASURING THE BENDING STIFFNESS OF FLEXIBLE PACKAGING MATERIALS; 2002 PFFC PEER-REVIEWED PAPER; March 2002 incorporated by reference herein. Bending stiffness is reported as milli-Newton (mN) per millimeter (mm), or mN*mm.

2% Secant Modulus (machine direction, MD and cross direction CD) is measured according to ASTM D882-10 (average of five film samples in each direction; each sample "1 in×6 in" or 25 mm×150 mm).

Density is determined in accordance with ASTM D792.

Differential Scanning Calorimetry (DSC)

Differential Scanning calorimetry (DSC) is used to measure melting and crystallization behavior of polymers (e.g., ethylene-based (PE) polymers). The sample is first melt pressed into a thin film at ca 175° C. and then cooled to room temperature. About 5 to 8 mg of polymer film sample is cut with a die punch and is weighed and placed into a DSC pan. The lid is crimped on the pan to ensure a closed atmosphere. The sample pan is placed into a calibrated DSC cell purged with nitrogen gas, and then heated at a rate of approximately 10° C./min, to a temperature of 180° C. for PE. The sample is kept at this temperature for three minutes. Then the sample is cooled at a rate of 10° C./min to −40° C. to record the crystallization trace, and kept isothermally at that temperature for three minutes. The sample is next reheated at a rate of 10° C./min, until complete melting and the resultant second melting trace is used to calculated heat of melting and melting temperature. The percent crystallinity is calculated by dividing the heat of melting ($H_m$), determined from the second heating curve, by a theoretical heat of fusion of 292 J/g for PE (165 J/g, for PP), and multiplying this quantity by 100 (for example, % cryst.=($H_m$/292 J/g)×100 (for PE)).

Unless otherwise stated, peak melting point ($T_m$) is determined from the second heating curve and corresponds to the temperature of the highest peak in the endotherm. The crystallization temperature ($T_c$) is determined from the cooling curve (peak Tc).

Heat seal strength is determined using an Enepay Hot Tack Instrument. The Enepay Hot Tack Instrument measures the strength of heat seals formed between thermoplastic surfaces immediately after a heat seal has been made and before it cools to ambient temperature. For this purpose, strips having 1 inch wide±0.5% and 10 to 14 inches in length are cut from the film in the MD direction. Test settings include: test speed (clamp separation rate) of 200 mm/s (1200 cm/min), Dwell Time of 240 msec, Jaw Pressure of 1.034 MPa, Cool time 400 msec, and a temperature of 120° C. Samples are inserted in the test station where the machine makes the seal and proceeds to test seal strength to be reported in Newton/centimeter or N/cm.

The "onset end of the melting temperature" (or "onset end temperature") is the extrapolated end of the melting curve calculated from the intersection of two lines a and b, where a is the tangent with the point of maximum slope on the secondary side of the peak and b is the extrapolation of the baseline after the melting.

Melt Flow Rate or "MFR" is determined according to ASTM D1238 (230° C., 2.16 kg).

Melt index (or "MI") is determined according to ASTM D1238 (190° C., 2.16 kg).

The term "molecular weight distribution" or "MWD" is the ratio of weight average molecular weight to number average molecular weight (Mw/Mn). Mw and Mn are determined according to conventional gel permeation chromatography (GPC).

Tensile Strength and Tensile Energy to Break (MD and CD) are measured in accordance with ASTM D882-10 (average of five film samples in each direction; each sample "1 in×6 in" or 25 mm×150 mm).

Vicat softening temperature is the determination of the softening point for materials that have no definite melting point. Vicat softening temperature is measured in accordance with ASTM D 1525.

DETAILED DESCRIPTION

The present disclosure provides a multilayer film having at least three layers. In an embodiment, the multilayer film includes two skin layers and a core layer, each layer composed of one or more polymeric components. The skin layers include a blend of a low density polyethylene and an ethylene-based elastomer. The ethylene-based elastomer has a density less than 0.90 g/cc. The core layer is located between the skin layers. The core layer includes a propylene-based plastomer having a density less than 0.90 g/cc.

The multilayer film has an onset end temperature from 90° C. to 110° C. and a heat seal strength at 120° C. from 1.5 N/cm to 2.5 N/cm.

The multilayer film can be (i) coextruded, (ii) laminated, or (iii) a combination of (i) and (ii).

In an embodiment, the multilayer film is a coextruded multilayer film.

The multilayer film is flexible, resilient, deformable, and pliable. The skin layers are surface layers with the core layer sandwiched between the surface layers. The multilayer film has from at least three layers, or four layers, or five layers, or six layers to seven layers, or eight layers, or nine layers, or 10 layers, or 11 layers, or more.

In an embodiment, the film has from three layers to five layers.

In an embodiment, the multilayer film has a thickness from 75 microns, or 100 microns, or 125 microns, or 126 microns, or 127 microns, or 128 microns, 129 microns, or 130 microns, or 135 microns, or 145 microns, or 150 microns to 200 microns, or 250 microns or 300 microns or 350 microns.

1. Skin Layers

The multilayer film includes two skin layers. Each skin layer is an outermost layer. The composition of the each skin layer can be the same or different. Each skin layer is composed of a blend of a low density polyethylene (LDPE) and an ethylene-based elastomer having density less than 0.90 g/cc.

In an embodiment, the composition of each skin layer is the same.

A. Ethylene-Based Elastomer

Each skin layer includes an ethylene-based elastomer. An "elastomer" is a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72. An "ethylene-based elastomer," is an elastomer comprising at least 50 wt % units derived from ethylene, with the foregoing elastomeric properties.

In an embodiment, the ethylene-based elastomer is an ethylene/$C_4$-$C_8$ α-olefin copolymer having the foregoing elastomeric properties. The α-olefin comonomer is a $C_4$-$C_8$ α-olefin selected from 1-butene, 1-hexene, or 1-octene.

In an embodiment, the ethylene-based elastomer is an ethylene/$C_4$-$C_8$ α-olefin copolymer having one, some, or all of the following properties:

(i) a density from 0.860 g/cc, or 0.870/cc, or 0.880 g/cc to 0.885 g/cc, or 0.890, or 0.895, or less than 0.900 g/cc;

(ii) a vicat softening temperature from 40° C., or 45° C., or 50° C., or 55° C., or 60° C., or 61° C., or 62° C. to 63° C., or 64° C., or 65° C.;

(iii) a melting temperature, Tm, from 60° C., or 63° C., or 65° C., or 67° C., or 69° C. to 70° C., or 72° C., or 73° C. to 75° C., or 77° C., or 79° C., or 80° C.; and (iv) a melt index from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min.

Nonlimiting examples of suitable ethylene-based elastomers include polymers sold under the tradenames ENGAGE™ and AFFINITY™ available from The Dow Chemical Company.

Each skin layer also includes a low density polyethylene. The term "low density polyethylene," or "LDPE," consists of ethylene homopolymer, or ethylene-α-olefin copolymer comprising at least one $C_3$-$C_{10}$ α-olefin, or $C_3$-$C_4$ that has a density from 0.915 g/cc to 0.940 g/cc, and contains long chain branching with broad MWD. LDPE is typically produced by way of high pressure free radical polymerization (tubular reactor or autoclave with free radical initiator). LDPE examples include MarFlex (Chevron Phillips), LUPOLEN™ (LyondellBasell), as well as LDPE products from *Borealis*, Ineos, ExxonMobil, and others.

In an embodiment, LDPE excludes linear low density polyethylene.

Each skin layer contains a blend of the LDPE and the ethylene-based elastomer. In an embodiment, each skin layer includes from 10 wt %, or 12 wt %, or 14 wt % to 15 wt %, or 16 wt %, or 18 wt % to 20 wt % of the LDPE, based on the total weight of the skin layer.

In an embodiment, each skin layer includes from greater than 0 wt %, or 1 wt %, or 2 wt %, or 3 wt %, or 4 wt %, or 5 wt % to 6 wt %, or 7 wt %, or 8 wt %, or 9 wt % to 10 wt %, total additives (based on total weight of the respective skin layer). Non-limiting examples of suitable additives include stabilizers, slip additives, antiblocking agent, process aids, clarifiers, nucleators, pigments or colorants, fillers and reinforcing agents.

In an embodiment, the additive is a filler. Nonlimiting examples of suitable filler include starch, clay, talc, powdered metals, silicates, phosphates, mica, silica, alumina, aluminosilicates, aluminophosphates, carbon whiskers, carbon fibers, nanoparticles including nanotubes, wollastonite, graphite, zeolites, and ceramics, such as silicon carbide, silicon nitride, titania (titanium dioxide), and any combination thereof.

In an embodiment, each skin layer includes greater than 0 wt %, or 1 wt %, or 2 wt %, or 3 wt %, or 4 wt %, or 5 wt % to 6 wt %, or 7 wt %, or 8 wt %, or 9 wt %, or less than 10 wt % filler. In a further embodiment, the filler is talc.

2. Core Layer

The multilayer film includes a core layer. The core layer is located between the skin layers. The core layer includes a propylene-based plastomer having a density less than 0.90 g/cc.

A. Propylene-Based Plastomer

A "propylene-based plastomer" is a propylene/ethylene copolymer having from 3 wt %, or 4 wt %, or 5 wt %, or 6 wt %, or 7 wt % to 8 wt %, or 9 wt %, or 10 wt %, or 11 wt %, or 12 wt %, or 13 wt %, or 14 wt %, or 15 wt % ethylene comonomer (based on total weight of the plastomer). The propylene-based plastomer has a heat of fusion less than 100 J/g and an Mw/Mn less than 3.5. The propylene-based plastomer has a heat of fusion less than 40 J/g when the ethylene comonomer content is from 10 wt %, or 11 wt %, or 12 wt % to 13 wt %, or 14 wt %, or 15 wt %.

In an embodiment, the propylene-based plastomer is a propylene/ethylene copolymer with from 3 wt % to less than 10 wt % ethylene comonomer and having one, some, or all of the following properties:

(i) a density from 0.860 g/cc, or 0.870/cc, or 0.880 g/cc to 0.885 g/cc, or 0.890, or 0.895, or less than 0.90 g/cc;

(ii) a vicat softening temperature from 60° C., or 61° C., or 62° C. to 63° C., or 64° C., or 65° C.;

(iii) a melting temperature, Tm, from 70° C., or 73° C., or 75° C., or 77° C., or 79° C. to 80° C., or 82° C., or 83° C. to 85° C., or 87° C., or 89° C., or 90° C.; and (iv) a melt flow rate from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min.

Nonlimiting examples of suitable propylene-based plastomer include VERSIFY 2000 and VERSIFY 2200, available from The Dow Chemical Company.

3. Intermediate Layers

In an embodiment, the multilayer film includes one or more intermediate layers. An "intermediate layer" is a non-surface layer that is located between the core layer and one of the skin layers. Nonlimiting examples of a multilayer film having intermediate layers include skin/intermediate/core/skin (four-layer structure), skin/intermediate/core/intermediate/skin (five-layer structure), and skin/intermediate/intermediate/core/intermediate/intermediate/skin (seven layer structure).

The multilayer film has at least three layers. When intermediate layers are present, the multilayer film has from four layers, or five layers, or six layers to seven layers, or eight layers, or nine layers, or 10 layers, or 11 layers, or more.

In an embodiment, the multilayer film has from three layers to five layers.

In an embodiment, the intermediate layer(s) include a propylene-based plastomer. The propylene-based plastomer may be any propylene-based plastomer as disclosed herein.

In an embodiment, the multilayer film includes one or more intermediate layers containing propylene-based plastomer, the propylene-based plastomer being the same propylene-based plastomer in the core layer.

In an embodiment, the multilayer film includes one or more intermediate layers located between the core layer and a skin layer. The one or more intermediate layers include an ethylene-based elastomer having a density less than 0.90 g/cc.

In an embodiment, the multilayer film includes one or more intermediate layers located between the core layer and a skin layer. Each of the one or more intermediate layers includes a blend of an LDPE and an ethylene-based elastomer having a density less than 0.90 g/cc. In a further embodiment, the ethylene-based elastomer in the skin layers is the same ethylene-based elastomer in the intermediate layers.

In an embodiment, the multilayer film includes one or more intermediate layers located between the core layer and a skin layer. Each of the one or more intermediate layers includes a blend of an LDPE and an ethylene-based elastomer having a density less than 0.90 g/cc. In a further embodiment, the ethylene-based elastomer in the skin layers is the same ethylene-based elastomer in the intermediate layers and the LDPE in the skin layer is the same LDPE as in the one or more intermediate layers.

4. Multilayer Film

In an embodiment, the multilayer film includes three layers-two skin layers and a core layer. The three layer film has a thickness from 100 microns to 200 microns. Each skin layer includes a blend of the ethylene-based elastomer (with density less than 0.90 g/cc) and from greater than 0 wt % to 10 wt % LDPE. The core layer has a propylene-based plastomer with a density less than 0.90 g/cc. The multilayer film has an onset end temperature from 90° C., or greater than 90° C., or 93° C., or 95° C., or 97° C. to 99° C., or 100° C., or 101° C., or 103° C., or 105° C., or 107° C., or 109° C., or 110° C. The multilayer film also has a heat seal strength (skin layer-to-skin layer) at 120° C. from 1.5 N/cm, or 1.7 N/cm, or 1.9 N/cm to 2.0 N/cm, or 2.1 N/cm, or 2.3 N/cm, or 2.5 N/cm.

In an embodiment, the multilayer film has five layers (Film 1). Each skin layer includes a blend of ethylene-based elastomer (with density less than 0.90 g/cc) and from greater than 0 wt % to 10 wt % LDPE. Each intermediate layer contains an ethylene-based elastomer (with density less than 0.90 g/cc) (and optionally blended with LDPE). The core layer contains a propylene-based plastomer with a density less than 0.90 g/cc.

In an embodiment, Film 1 has one, some, or all of the following properties:

(i) a Vicat softening temperature from 55° C., or 56° C., or 57° C., or 58° C., or 59° C. to 60° C., or 61° C., or 62° C., or 64° C., or 65° C.;

(ii) a melt temperature, Tm, from 80° C., or 81° C., or 82° C., or 83° C. to 84° C., or 85° C. and a crystallization temperature, Tc, from 70° C., or 72° C. to 73° C., or 75° C.;

(iii) a bending stiffness from 13 mN*mm, or 14 mN*mm, or 15 mN*mm to 16 mN*mm, or 17 mN*mm;

(iv) a 2% secant modulus (machine direction, or "MD") from 40 mega Pascals (MPa), or 60 MPa to 70 MPa, or 90 MPa, to 110 MPa;

(v) an onset end temperature from 90° C., or greater than 90° C., or 93° C., or 95° C., or 97° C. to 99° C., or 100° C., or 101° C., or 103° C., or 105° C., or 107° C., or 109° C., or 110° C.;

and (vi) a heat seal strength (skin layer-to-skin layer) at 120° C. from 1.5 N/cm, or 1.7 N/cm, or 1.9 N/cm to 2.0 N/cm, or 2.1 N/cm, or 2.3 N/cm, or 2.5 N/cm.

The present film structure may comprise two or more embodiments disclosed herein.

5. Package

The present disclosure provides a package. In an embodiment, the package includes (A) an ingredient, and (B) a protective film. The protective film can be any multilayer film having at least three layers as disclosed herein. The multilayer protective film includes skin layers composed of a blend of LDPE and ethylene-based elastomer having a density less than 0.90 g/cc. The multilayer film also includes a core layer located between the skin layers. The core layer includes a propylene-based plastomer having a density less than 0.90 g/cc.

The protective film defines an interior in which the ingredient is stored or otherwise is contained. The protective film fully surrounds, or otherwise fully encloses, the ingredient. In an embodiment, the package includes at least one heat seal and fully encloses the ingredient in the interior. In other words, the protective film of the package completely isolates the ingredient from the ambient environment.

In an embodiment, the ingredient is a flowable solid. Nonlimiting examples of flowable solids include grains, particles, and pellets. Nonlimiting examples of ingredients suitable for containment within the package include ethylene/propylene/diene monomer (EPDM), rubber (natural rubber and/or synthetic rubber, neoprene rubber, silicone rubber, and combinations thereof.

In an embodiment, the package is a batch inclusion package.

In an embodiment, the package is a batch inclusion package and the protective film fully encloses an ingredient that is EPDM. The protective film is in contact with the EPDM.

In an embodiment, the package includes a peripheral edge. At the peripheral edge two skin layers are in direct contact with each other. The contacting skin layers are subjected to a heat sealing process and are sealed together. The heat seal has a heat seal strength at 120° C. from 1.5 N/cm, or 1.7 N/cm, or 1.9 N/cm to 2.0 N/cm, or 2.1 N/cm, or 2.3 N/cm, or 2.5 N/cm.

The present package may comprise two or more embodiments disclosed herein.

Some embodiments of the present disclosure will now be described in detail in the following Examples.

EXAMPLES

1. Materials

Materials for inventive examples and comparative samples are provided in Table 1 below.

TABLE 1

| Commercial Name | Description | I2 (g/10 min) | Density (g/cc) | Tm (° C.) | vicat (° C.) |
|---|---|---|---|---|---|
| Versify 2200 | Propylene-based plastomer | 2.0* | 0.876 | 82 | 63 |
| Engage 8003 | Ethylene-based elastomer | 1.0 | 0.885 | 77 | 63 |
| Engage 8100 | Ethylene-based elastomer | 1.0 | 0.870 | 60 | 45 |
| Affinity 8770 | Ethylene/octene copolymer | 1.0 | 0.885 | 74 | 57 |
| Ethylene vinyl acetate (EVA) | | | | | |
| Ampacet 100342 | Ampacet 100342 a 20% Whitemist (AB) in AFFINITY 6MI (.90 density) | | | | |
| Antiblock 20%Talc AB in ENGAGE 8003 (hereafter "AB") | 20% Talc AB in ENGAGE 8003 | | | | |
| Ampacet 100450 | Ampacet 100450 a 20% Superfloss (AB) in LDPE | | | | |
| Ampacet 10090 | Ampacet10090 a 5% Slip in 8MI LDPE | | | | |

2. Multilayer Film Production

Five layer films (skin/intermediate/core/intermediate/skin) are produced on a five-layer blown film line. The blown film line is a 75 mm 5-Layer Flat Die (30/10/20/10/30) with 25 mm skin extruders and 20 mm intermediate/core extruders. The line has a Dual Lip Air Ring, ABS Gravimetric Feed, and Dual Surface Winders. The line produces 0.8 mils to 6 mils thick films with blow up ratios between 2.2 and 3.9, production rates between 9 and 27 kg/hr, haul-off between 2.4 and 18 meter per min, and on-line slitting and separating.

Table 2 provides the processing conditions for the production of multilayer films.

TABLE 2

Processing Conditions, Multilayer Films

| | Extruder 1 | Extruder 2 | Extruder 3 | Extruder 4 | Extruder 5 |
|---|---|---|---|---|---|
| Barrel 1° C. | 132 | 132 | 132 | 132 | 132 |
| Barrel 2° C. | 149 | 149 | 149 | 149 | 149 |
| Barrel 3° C. | 177 | 177 | 177 | 177 | 177 |
| Barrel 4° C. | 188 | | | | 188 |
| Die ° C. | 216 | 216 | 216 | 216 | 216 |
| Melt ° C. | 209 | 216 | 219 | 21 | 211 |
| Pressure (MPa) | 17.7 | 26.3 | 22.3 | 27.4 | 18.8 |
| Speed rpm | 52 | 62 | 129 | 62 | 51 |
| Current % | 81 | 63 | 62 | 60 | 75 |
| Production rate kg/hr | 3.6 | 1.9 | 3.5 | 1.9 | 3.6 |

Table 3 shows the run conditions and parameters for the production of five layer films comparative samples 1-3, inventive examples 4-5 and control EVA. Weight percents are based on total weight of the respective film layer.

TABLE 3

Multilayer Film Structures

| | Comparative Sample 1 Versify 2200 Film Total Thickness: 145 micron | | Comparative Sample 2 Versify 2200 (core)/ Engage 8004 (skin): 25/50/25 Film Total Thickness: 145 microns | | Comparative Sample 3 Versify 2200 (core)/ Engage 8100 (skin): 20/60/20 Film Total Thickness: 145 microns | | Example 4 Versify 2200 (core)/ Affinity 8770 (skin): 35/30/35 Film Total Thickness: 145 microns | | Example 5 Versify 2200 (core)/ Affinity 8770 (skin): 35/30/35 No PE Film Total Thickness: 145 microns | |
|---|---|---|---|---|---|---|---|---|---|---|
| Layer 1 | Amount | Component | Amount | Component | Amount | Component | Amount | Component | Amount | Component |
| | 90.0% | Versify 2200 | 86.0% | Engage 8003 | 86.0% | Engage 8100 | 80.0% | Affinity 8770 | 90.0% | Affinity 8770 |
| | 5.0% | Ampacet 100329 | 7.0% | Ampacet 100329 | 7.0% | Ampacet 100329 | 10.0% | LDPE 132 | 5.0% | mpacet 1009 |
| | 5.0% | Ampacet 100342 | 7.0% | AB | 7.0% | AB | 5.0% | mpacet 1009 | 5.0% | npacet 1004 |
| | | | | | | | 5.0% | npacet 1004 | | |
| Total | 100.0% | | 100.0% | | 100.0% | | 100.0% | | 100.0% | |
| Layer 2 | Amount | Component | Amount | Component | Amount | Component | Amount | Component | Amount | Component |
| | 100.0% | Versify 2200 | 100.0% | Versify 2200 | 100.0% | Versify 2200 | 90.0% | Affinity 8770 | 100.0% | Affinity 8770 |
| | | | | | | | 10.0% | LDPE 132 | | |
| Total | 100.0% | | 100.0% | | 100.0% | | 100.0% | | 100.0% | |
| Layer 3 | Amount | Component | Amount | Component | Amount | Component | Amount | Component | Amount | Component |
| | 100.0% | Versify 2200 | 100.0% | Versify 2200 | 100.0% | Versify 2200 | 100.0% | Versify 2200 | 100.0% | Versify 220 |
| Total | 100.0% | | 100.0% | | 100.0% | | 100.0% | | 100.0% | |
| Layer 4 | Amount | Component | Amount | Component | Amount | Component | Amount | Component | Amount | Component |
| | 100.0% | Versify 2200 | 100.0% | Versify 2200 | 100.0% | Versify 2200 | 90.0% | Affinity 8770 | 100.0% | Affinity 8770 |
| | | | | | | | 10.0% | LDPE 132 | | |
| Total | 100.0% | | 100.0% | | 100.0% | | 100.0% | | 100.0% | |
| Layer 5 | Amount | Component | Amount | Component | Amount | Component | Amount | Component | Amount | Component |
| | 90.0% | Versify 2200 | 86.0% | Engage 8003 | 86.0% | Engage 8100 | 80.0% | Affinity 8770 | 90.0% | Affinity 8770 |
| | 5.0% | Ampacet 100329 | 7.0% | Ampacet 100329 | 7.0% | Ampacet 100329 | 10.0% | LDPE 132 | 5.0% | mpacet 1009 |
| | 5.0% | Ampacet 100342 | 7.0% | AB | 7.0% | AB | 5.0% | mpacet 1009 | 5.0% | npacet 1004 |
| | | | | | | | 5.0% | Npacet 1004 | | |
| Total | 100.0% | | 100.0% | | 100.0% | | 100.0% | | 100.0% | |
| Overall | Amount | Thickness (mils) | Overall | Amount | Thickness (mils) | Overall | Amount | Thickness (mils) | Overall | Amount | Thickness (mils) | Overall | Amount | Thickness (mills) |
| Layer 1 | 30.0% | 1.7 | Layer 1 | 25.0% | 1.4 | Layer 1 | 20.0% | 1.1 | Layer 1 | 20.0% | 1.2 | Layer 1 | 20.0% | 1.2 |
| Layer 2 | 10.0% | 0.6 | Layer 2 | 10.0% | 0.6 | Layer 2 | 10.0% | 0.6 | Layer 2 | 15.0% | 0.9 | Layer 2 | 15.0% | 0.9 |

TABLE 3-continued

| | | | | | | | | | | | | | | |
|---|---|---|---|---|---|---|---|---|---|---|---|---|---|---|
| | | | | | Multilayer Film Structures | | | | | | | | | |
| Layer 3 | 20.0% | 1.1 | Layer 3 | 30.0% | 1.7 | Layer 3 | 40.0% | 2.3 | Layer 3 | 30.0% | 1.8 | Layer 3 | 30.0% | 1.8 |
| Layer 4 | 10.0% | 0.6 | Layer 4 | 10.0% | 0.6 | Layer 4 | 10.0% | 0.6 | Layer 4 | 15.0% | 0.9 | Layer 4 | 15.0% | 0.9 |
| Layer 5 | 30.0% | 1.7 | Layer 5 | 25.0% | 1.4 | Layer 5 | 20.0% | 1.1 | Layer 5 | 20.0% | 1.2 | Layer 5 | 20.0% | 1.2 |
| Total | 100.0% | 5.7 | Total | 100% | 5.7 | Total | 100% | 5.7 | Total | 100% | 6.0 | | 100% | 6.0 |

Example 4 and 5 both using Ampacet 10090 (slip aid) and 100450 (antiblock)

The properties for the multilayer films Comparative Samples 1-3 and Inventive Examples 4-5 are provided in Table 4 below. Control is an incumbent EVA bag having a thickness from 5.5 mils to 6 mils.

TABLE 4

Multilayer Film Property Characterization

| | | CS1 Versify 2200 5.7 mil[x] | CS2 V2200 (c)/E8003 (s) 5/50/25 5.7 mil[x] | CS3 V2200 (c)/E8100 (s) 20/60/20 5.7 mil[x] | Example 4 V2200 (c)/A8770 (s) 35/30/35 + 10% PE | Example 5 V2200 (c)/A8770 (s) 35/30/35 | control EVA bag* |
|---|---|---|---|---|---|---|---|
| Density | g/cc | 0.882 | 0.887 | 0.88 | — | — | 0.935 |
| Melt Index 2.16 kg @190 C. | | 0.86 | 1 | 0.92 | — | — | 0.89 |
| Average Kinetic COF II | — | 0.119 | 0.175 | 0.276 | 0.41 | 0.57 | 0.31 |
| Average Static COF II | — | 0.14 | 0.245 | 0.35 | 0.55 | 0.66 | 0.35 |
| Tm | C. | 81 | 81 | 81 | 81 | 81 | 88 |
| Onset end of melt temperature | C. | 91 | 95 | 91 | 109 | 96 | 95 |
| Tc | C. | 40 | 70 | 40 | 75 | 70 | 72 |
| Vicat | C. | 65 | 64 | 57 | — | — | 61 |
| Avg-Modulus -CD | MPa | 106 | 66 | 69 | 55 | 51 | 53 |
| Avg-Secant Modulus At 1% | MPa | 106 | 68 | 70 | 55 | 51 | 53 |
| Avg-Secant Modulus At 2% | MPa | 103 | 66 | 69 | 54 | 50 | 51 |
| Avg-Modulus - MD | MPa | 102 | 66 | 67 | 58 | 54 | 52 |
| Avg-Secant Modulus At 1% | MPa | 102 | 66 | 67 | 58 | 54 | 53 |
| Avg-Secant Modulus At 2% | MPa | 100 | 65 | 66 | 57 | 53 | 50 |
| Avg-Break Stress -CD | MPa | 33 | 9 | 28 | 26 | 30 | 20 |
| Avg-Strain At Break | % | 782 | 876 | 785 | 812 | 701 | 717 |
| Avg-Strain At Yield | % | 23 | 23 | 25 | 710 | 101 | 75 |
| Avg-Stress At Yield | MPa | 8 | 6 | 5 | 27 | 5 | 5 |
| Avg-Break Stress -MD | MPa | 36 | 8 | 28 | 35 | 34 | 19 |
| Avg-Strain At Break | % | 743 | 808 | 738 | 751 | 693 | 459 |
| Avg-Strain At Yield | % | 22 | 42 | 28 | 747 | 101 | 90 |
| Avg-Stress At Yield | MPa | 8 | 6 | 6 | 33 | 5 | 8 |
| Average Thickness | mm | 0.122 | 0.140 | 0.135 | 0.160 | 0.160 | 0.145 |
| Heat Seal @120° C. | N/cm | — | — | — | 2.36 | 1.97 | 1.18 |
| Bending Stiffness | mN*mm | 15.7 | 15.0 | 13.8 | 19.3 | 17.9 | 13.3 |

*comparative sample
CS—comparative sample

Inventive Examples 4-5 unexpectedly provide a multilayer film structure with an onset end temperature from 90° C. to 110° C. and a heat seal strength at 120° C. (skin-to-skin) from 1.5 N/cm to 2.5 N/cm. The films of examples 4-5 also have a low Tm (81° C.), which is less than the Tm of the control sample, the EVA, which is 88° C. The films of Examples 4-5 can be used as batch inclusion bags whereby the film is incorporated and dispersed during the mixing process of the bag's contents. The Tm of 81° C. makes inventive Examples 4-5 suitable for low temperature (less than 85° C.) batch inclusion package applications. The films of Examples 4-5 also possess higher stiffness and comparable heat seal strength for proper use in industrial scale bagging lines for the production of batch inclusion bags.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A multilayer film having at least three layers comprising:
   skin layers that are outermost surface layers of the multilayer film, each skin layer consisting of a blend of (1) from greater than 0 wt % to 10 wt % of at least two different low density polyethylenes to the exclusion of linear low density polyethylene, (2) an ethylene-based elastomer consisting of (i) ethylene, and (ii) a $C_6$-$C_8$ α-olefin comonomer and having a density less than 0.90 g/cc, and (3) optional additives selected from the group consisting of stabilizer, slip additive, antiblocking agent, process aid, clarifier, nucleator, pigment, colorant, filler, reinforcing agent, and combinations thereof;
   a core layer located between the skin layers, the core layer comprising a propylene-based plastomer having a density less than 0.90 g/cc;
   two intermediate layers, each intermediate layer located between the core layer and a skin layer, each skin layer directly contacts a respective intermediate layer, each intermediate layer comprising an ethylene-based elastomer having a density less than 0.90 g/cc;
   and
   the multilayer film has an onset end temperature from 90° C. to 110° C. and a heat seal strength at 120° C. from 1.5 N/cm to 2.5 N/cm.

2. The multilayer film of claim 1 wherein the two intermediate layers each comprise a blend of a low density polyethylene and the ethylene-based elastomer.

3. The multilayer film of claim 2 wherein the ethylene-based elastomer in the skin layers is the same ethylene-based elastomer in the intermediate layers.

4. The multilayer film of claim 3 wherein one of the low density polyethylenes in the skin layer is the same low density polyethylene in the intermediate layers.

5. The multilayer film of claim 1 wherein each skin layer consists of from greater than 0 wt % to 10 wt % additives.

6. The multilayer film of claim 1 wherein the multilayer film has a crystallization temperature, Tc, from 70° C. to 75° C. and a melt temperature, Tm, from 80° C. to 85° C.

7. The multilayer film of claim 1 wherein the multilayer film has a 2% secant modulus (MD) from 40 MPa to 110 MPa.

8. The multilayer film of claim 7 wherein the multilayer film has a bending stiffness from 13 mN*mm to 17 mN*mm.

* * * * *